July 29, 1941.    C. W. DIECKMANN    2,250,753
LOCKING MEANS FOR BEARING STUDS AND NUTS
Filed Nov. 1, 1939
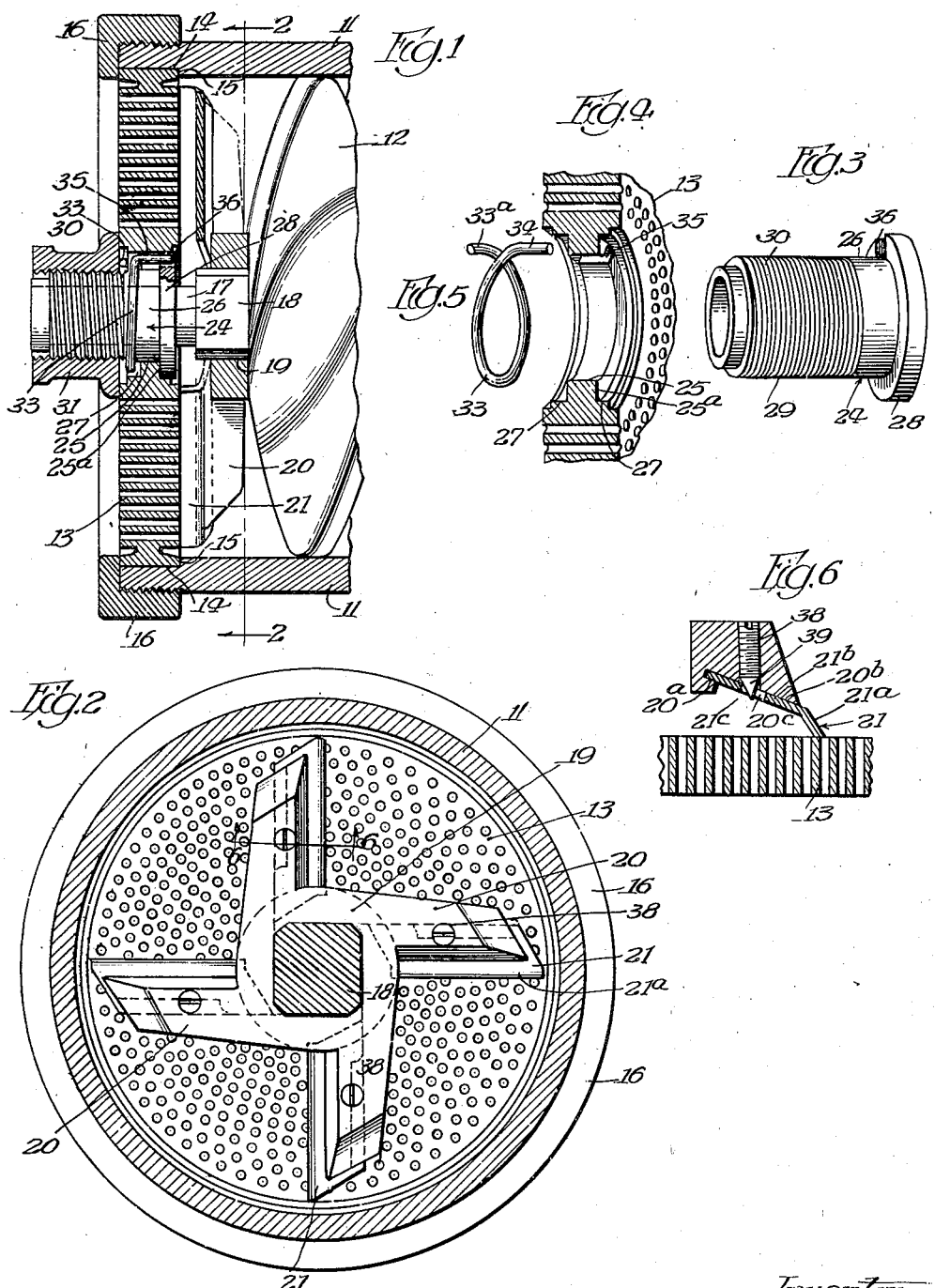
Inventor
Charles W. Dieckmann
By Fred Gerlach
His Atty Patented July 29, 1941

2,250,753

UNITED STATES PATENT OFFICE 2,250,753

LOCKING MEANS FOR BEARING STUDS AND NUTS

Charles W. Dieckmann, Chicago, Ill.

Application November 1, 1939, Serial No. 302,329

6 Claims. (Cl. 151—32)

The invention relates to rotary meat grinders.

One object of the invention is to provide improved means for rotatably supporting one end of the worm and cutter-shaft in the perforated plate which coacts with the knives.

Other objects of the invention will appear from the detailed description.

The invention consists in the several novel features which are hereinafter set forth and are more particularly defined by claims at the conclusion hereof.

In the drawing:

Fig. 1 is a fragmentary longitudinal section of a meat-grinder embodying the invention.

Fig. 2 is a transverse section on line 2—2 of Fig. 1.

Fig. 3 is a section on an enlarged scale, illustrating the bushing for the worm and knife-shaft.

Fig. 4 is a detail section of the central portion of the perforated plate.

Fig. 5 is a detail of the spring for locking the bushing against rotation in the cutter-plate and for holding the retaining-nut for the bushing against rotation.

Fig. 6 is a section through one of the knives and spider-arms, taken on line 6—6 of Fig. 2.

The invention is exemplified in a machine comprising a cylinder 11 through which the meat to be ground is advanced by a feed-screw 12 which is rotatable in the body and adapted to be driven by any suitable means, as well understood in the art. A perforated plate 13, which co-acts with the knives, is mounted in the discharge end of cylinder 11. A screw-collar 16 secures the plate 13 against rotation, it being seated in an annular groove 14 and against a shoulder 15 on the cylinder 11.

The feed-worm 12 is provided at the discharge end of the cylinder with a spindle or shaft 17 which rotates with said worm. This shaft is provided with a polygonal portion which extends through a correspondingly polygonal opening in a spider 19 which is provided with arms 20 to which the knives 21 are secured. The knives 21 rotate across the inner face of perforated plate 13 to cut the meat and discharge it through the perforations in said plate, as well understood in the art.

In practice, the plate 13 is usually formed of hard metal, such as steel, and the outer end of shaft 17 is subjected to vibration and off-center stresses during the operation of the cutter and, therefore, it is important to provide efficient bearing-means for the outer end of the shaft which is supported from the plate and also to provide for ready removal of the plate and associated parts for cleaning or washing.

Shaft 17 is journaled in an elongated bushing 24. Plate 13 is provided at its longitudinal center with a rib 25ª having a cylindrical bearing-surface 25 for the portion 26 of the bushing. The plate is provided with an annular central recess 27 in each of its faces and at the sides of bearing 25. Bushing 24 is provided at its inner end with an integral flange 28 which is adapted to fit in either of the grooves 27 and against the rib 25ª. The plate 13 is rendered reversible by the provision of recesses 27 in its opposite faces so that when the edges of the perforations at one side thereof become worn, the other face of the plate may co-act with the knives. The body 29 of the bushing extends through bearing 25 and beyond the plate and is provided with a screwthread 30 for a retaining-nut 31. This nut engages the outer face of plate 13 and, when tightened, clamps the outer side of flange 28 against the inner face of the rib 25ª of the plate to secure the bushing firmly in the plate for efficiently supporting the outer end of shaft 17 from the plate.

A compression-spring 33 has a coil extending around the bushing and is located in the recess 27 and between bearing 25 and nut 31. The outer end 33ª of spring 33 is extended to exert pressure against the nut 31 and retains it against being loosened by the vibration to which the shaft is subjected in operation. The spring 33 is provided with an integral terminal 34 which extends longitudinally of the axis of the bushing through a notch 35 formed in the rib 25ª and into a notch 36 formed in flange 28 of bushing 24. This terminal locks the bushing against rotation in plate 13. The spring 33, with its terminal 34, function as combined means for retaining the nut 31 against being loosened and retaining the bushing against rotation in the plate 13.

This construction also exemplifies one which can be readily assembled and disassembled for cleaning purposes. In assembling the plate and bushing, the body 29 of the bushing is passed through bearing 25 from the inner face of the plate until the flange 28 is seated in the recess 27 on the inner side of the plate. Spring 33 is then placed around the outer end of the bushing and its terminal 34 is passed through aligned notches 35 in rib 25ª and notch 36 in the bushing-flange 28. The nut is then screwed onto the bushing and against the outer face of plate 13. This will compress the coil of spring 33 so that the nut will be frictionally held against rotation relatively to the knife and bushing. When it is desired to reverse the plate 13, the nut 31 is removed and the bushing is inserted from the opposite side of the plate and assembled in the same manner.

Knives 21 are separately formed and are individually secured to the spider-arms 20, respectively. Each knife is stamped from a plate of metal and comprises an obliquely bent front portion 21a, the outer edge of which is adapted to engage the perforated plate and a rearwardly extending oblique portion 21b. Each spider-arm 20 is formed with a groove 20a which extends obliquely inwardly and rearwardly from the face on which the knife is carried and surrounds the rear edge and both faces of the rear portion of knife portion 21b. Each arm 20 is also provided with an inclined bearing face 20b between groove 20a and the front edge of the arm against which the portion 21b outside of the groove is seated. The knives are usually formed of hardened metal and each is provided with a hole 21c. A screw 38 is threaded to a hole which extends through each spider-arm 20 and is provided with a tapered end 39 which is adapted to engage one side of hole 21c of the knife. The tapered end of the screw, as the screw is tightened, jams or wedges the rear portion of knife-portion 21b against the end and the outer face of groove 20a in the arm, and secures the knife against movement on the arm. This exemplifies simple means for efficiently and individually securing or jamming the knife-blades in radial grooves in the spider-arms and for quickly and removably securing the knives in the spider-arms so they can be easily replaced when worn.

The invention is not to be understood as restricted to the details set forth, since these may be modified within the scope of the appended claims, without departing from the spirit and scope of the invention.

Having thus described the invention, what I claim as new and desire to secure by Letters Patent is:

1. Means for rotatably supporting one end of a shaft in a non-rotatable plate which is provided with central recesses in both of its faces, comprising a bushing provided with a flange at its inner end fitting into the recess in the inner face of the plate, a nut screw-threaded to the outer end of the bushing for clamping the bushing and the plate together, and spring-means in the outer face of the plate and between the plate and the nut for retaining the nut against rotation.

2. Means for rotatably supporting one end of a shaft in a non-rotatable plate which is provided with central recesses in both of its faces, comprising a bushing provided with a flange at its inner end fitting into the recess in the inner face of the plate, a nut screw-threaded to the outer end of the bushing for clamping the bushing and the plate together, and a coil-spring around the bushing and in the recess in the outer face of the plate for retaining the nut against rotation, and provided with a terminal extending through the plate and into the bushing for locking the bushing against rotation in the plate.

3. Means for rotatably supporting one end of a shaft in a rotatable plate, comprising a bushing extending through and removable from the plate and provided with a shaft bearing, and means at its inner end for engaging the inner side of the plate, a nut screw-threaded to the outer end of the bushing for clamping the bushing and plate together, and a spring element interfitting, intermediate its ends, with the plate for holding the spring against rotation, having its inner end interfitting with the bushing for locking the latter against rotation, and having its outer end engaging the nut to retain the latter against rotation.

4. Means for rotatably supporting one end of a shaft in a rotatable plate, comprising a bushing extending through and removable from the plate and provided with a shaft bearing, and means at its inner end for engaging the inner side of the plate, a nut screw-threaded to the outer end of the housing for clamping the bushing and plate together, and a spring interfitting intermediate its ends with the plate for holding the spring against rotation, having its inner end interfitting with the bushing for locking the latter against rotation, and having at its outer end a loop extending around the bushing and engaging the nut to retain the latter against rotation.

5. Means for rotatably supporting one end of a shaft in a rotatable plate, comprising a bushing extending through and removable from the plate and provided with a shaft bearing, and means at its inner end for engaging the inner side of the plate, a nut screw-threaded to the outer end of the housing for clamping the bushing and plate together, and a resilient strip having a portion intermediate its ends, interfitting with, and extending through, the plate for holding the strip against rotation, having its inner end interfitting with the bushing for locking the latter against rotation, and having its outer end engaging the nut to retain the latter against rotation.

6. Means for rotatably supporting one end of a shaft in a rotatable plate, comprising a bushing extending through and removable from the plate and provided with a shaft bearing, and means at its inner end for engaging the inner side of the plate, a nut screw-threaded to the outer end of the bushing for clamping the bushing and plate together, and a resilient strip, having a portion intermediate its ends interfitting with, and extending through, the plate for holding the strip against rotation, having its inner end interfitting with the housing for locking the latter against rotation, and having at its outer end a loop extending around the bushing and engaging the nut to retain the latter against rotation.

CHARLES W. DIECKMANN.